(12) United States Patent
Luu et al.

(10) Patent No.: US 8,134,103 B2
(45) Date of Patent: Mar. 13, 2012

(54) BURNOUT TIME ESTIMATION AND EARLY THRUST TERMINATION DETERMINATION FOR A BOOSTING TARGET

(75) Inventors: Thu-Van T. Luu, Lumberton, NJ (US); Jeffrey B. Boka, Lumberton, NJ (US); Michael J. Harcourt, Sicklerville, NJ (US); Purusottam Mookerjee, Bridgewater, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1285 days.

(21) Appl. No.: 11/646,192

(22) Filed: Dec. 27, 2006

(65) Prior Publication Data

US 2011/0025551 A1 Feb. 3, 2011

(51) Int. Cl.
*F42B 15/01* (2006.01)
*G06F 19/00* (2011.01)
*F41G 7/00* (2006.01)
(52) U.S. Cl. ............. 244/3.1; 342/61; 342/62; 342/175; 342/195; 89/1.11
(58) Field of Classification Search ............ 244/3.1–3.3; 89/1.11; 342/59, 61–69, 82–115, 118, 146, 342/147, 175, 195, 52–56
See application file for complete search history.

(56) References Cited

U.S. PATENT DOCUMENTS

| | | | |
|---|---|---|---|
| 3,116,039 A | 12/1963 | Goldberg | |
| 3,156,435 A | 11/1964 | Edward et al. | |
| 3,164,339 A | 1/1965 | Schroader et al. | |
| 3,169,727 A | 2/1965 | Schroader et al. | |
| 3,206,143 A | 9/1965 | Von Munchihofen | |
| 3,527,167 A | 9/1970 | Morse | |
| 3,560,971 A | 2/1971 | Alsberg et al. | |
| 3,706,096 A | 12/1972 | Hammack | |
| 3,741,501 A * | 6/1973 | Salkeld | 244/3.14 |
| 3,741,502 A | 6/1973 | Schroader et al. | |
| 3,883,091 A | 5/1975 | Schaefer | |
| 3,951,359 A | 4/1976 | Willhite | |

(Continued)

FOREIGN PATENT DOCUMENTS
WO 98/58274 A1 12/1998

OTHER PUBLICATIONS

U.S. Appl. No. 12/967,149, filed Dec. 14, 2010, entitled "System and Method for Detecting use of Booster Rockets by Ballistic Missiles", in the name of Richard N. Pedersen.

(Continued)

*Primary Examiner* — Bernarr Gregory
(74) *Attorney, Agent, or Firm* — Howard IP Law Group PC (57) ABSTRACT

A system senses the presence of a boosting missile or target and processes the information by comparison of the data with a plurality of predetermined templates of nominal missile characteristics, in order to determine the state of the missile. The processing includes estimation of burnout time and of early thrust termination. Both are determined by generating current stage state estimates including position, velocity, time index error into the thrust template, and motor scale factor error. The change in motor scale factor is compared with a threshold to determine if early thrust termination has occurred. The estimated burnout time of the current stage is calculated from the burnout times of the current and the previous stage processed with the estimated motor scale factor and with state estimates from a filter.

18 Claims, 8 Drawing Sheets

U.S. PATENT DOCUMENTS

| | | | | |
|---|---|---|---|---|
| 3,964,695 | A | 6/1976 | Harris | |
| 3,982,713 | A | 9/1976 | Martin | |
| 3,996,590 | A | 12/1976 | Hammack | |
| 4,093,153 | A | 6/1978 | Bardash et al. | |
| 4,470,562 | A | 9/1984 | Hall et al. | |
| 4,502,650 | A | 3/1985 | Yueh | |
| 4,568,823 | A | 2/1986 | Diehl et al. | |
| 4,589,610 | A | 5/1986 | Schmidt | |
| 4,791,573 | A | 12/1988 | Zemany et al. | |
| 4,856,733 | A * | 8/1989 | Lachmann | 244/3.15 |
| 4,925,129 | A | 5/1990 | Salkeld et al. | |
| 5,050,818 | A * | 9/1991 | Sundermeyer | 244/3.15 |
| 5,170,440 | A | 12/1992 | Cox | |
| 5,198,607 | A | 3/1993 | Livingston et al. | |
| 5,296,861 | A | 3/1994 | Knight | |
| 5,319,556 | A | 6/1994 | Bessacini | |
| 5,340,056 | A | 8/1994 | Guelman et al. | |
| 5,341,142 | A | 8/1994 | Reis et al. | |
| 5,379,044 | A | 1/1995 | Carlson et al. | |
| 5,379,966 | A | 1/1995 | Simeone et al. | |
| 5,414,643 | A | 5/1995 | Blackman et al. | |
| 5,429,322 | A | 7/1995 | Waymeyer | |
| 5,458,041 | A * | 10/1995 | Sun et al. | 89/1.11 |
| 5,464,174 | A * | 11/1995 | Laures | 244/3.11 |
| 5,471,433 | A | 11/1995 | Hammell et al. | |
| 5,474,255 | A | 12/1995 | Levita | |
| 5,506,586 | A | 4/1996 | Bull | |
| 5,537,118 | A | 7/1996 | Appriou | |
| 5,557,347 | A * | 9/1996 | Johnson | 89/1.11 |
| 5,660,355 | A | 8/1997 | Waymeyer | |
| 5,710,423 | A | 1/1998 | Biven et al. | |
| 5,757,310 | A | 5/1998 | Millward | |
| 5,765,166 | A | 6/1998 | Gotfried et al. | |
| 5,788,179 | A | 8/1998 | Wicke | |
| 5,793,931 | A | 8/1998 | Hillis | |
| 5,811,788 | A | 9/1998 | Wicke | |
| 5,862,496 | A | 1/1999 | Biven | |
| 5,912,640 | A | 6/1999 | Bradford et al. | |
| 5,959,574 | A | 9/1999 | Poore, Jr. et al. | |
| 5,960,097 | A | 9/1999 | Pfeiffer et al. | |
| 6,011,507 | A | 1/2000 | Curran et al. | |
| 6,043,867 | A | 3/2000 | Saban | |
| 6,064,332 | A | 5/2000 | Cloutier | |
| 6,082,666 | A | 7/2000 | Windhorst et al. | |
| 6,091,361 | A | 7/2000 | Davis et al. | |
| 6,104,336 | A | 8/2000 | Curran et al. | |
| 6,209,820 | B1 | 4/2001 | Golan et al. | |
| 6,259,974 | B1 | 7/2001 | Bessacini et al. | |
| 6,262,680 | B1 | 7/2001 | Muto | |
| 6,278,401 | B1 | 8/2001 | Wigren | |
| 6,314,204 | B1 | 11/2001 | Cham et al. | |
| 6,404,380 | B2 | 6/2002 | Poore, Jr. | |
| 6,498,580 | B1 | 12/2002 | Bradford | |
| 6,527,222 | B1 * | 3/2003 | Redano | 244/3.14 |
| 6,543,716 | B1 | 4/2003 | Miller et al. | |
| 6,549,158 | B1 | 4/2003 | Hanson | |
| 6,561,074 | B1 | 5/2003 | Engel et al. | |
| 6,563,450 | B1 | 5/2003 | Wallace | |
| 6,568,628 | B1 | 5/2003 | Curtin et al. | |
| 6,575,400 | B1 | 6/2003 | Hopkins et al. | |
| 6,603,421 | B1 | 8/2003 | Schiff et al. | |
| 6,666,401 | B1 | 12/2003 | Mardirossian | |
| 6,674,390 | B1 | 1/2004 | Murphy, Jr. | |
| 6,720,907 | B1 | 4/2004 | Miron | |
| 6,736,547 | B2 | 5/2004 | Stevens et al. | |
| 6,739,547 | B2 * | 5/2004 | Redano | 244/3.14 |
| 6,750,806 | B2 | 6/2004 | Fischer | |
| 6,771,205 | B1 | 8/2004 | Barton et al. | |
| 6,799,138 | B2 | 9/2004 | Lawrence et al. | |
| 6,877,691 | B2 | 4/2005 | DeFlumere et al. | |
| 7,026,980 | B1 | 4/2006 | Mavroudakis et al. | |
| 7,137,588 | B2 | 11/2006 | Humphrey | |
| 7,181,323 | B1 | 2/2007 | Boka et al. | |
| 7,190,304 | B1 | 3/2007 | Carlson | |
| 7,348,918 | B2 * | 3/2008 | Redano | 342/62 |
| 7,394,047 | B1 * | 7/2008 | Pedersen | 244/3.1 |
| 7,400,289 | B1 * | 7/2008 | Wolf | 342/62 |
| 7,411,543 | B1 * | 8/2008 | Boka | 342/90 |
| 7,473,876 | B1 * | 1/2009 | Pedersen et al. | 244/3.1 |
| 7,511,252 | B1 * | 3/2009 | Pedersen et al. | 244/3.1 |
| 7,532,669 | B2 | 5/2009 | Wen et al. | |
| 7,552,669 | B1 | 6/2009 | Denis et al. | |
| 2002/0008657 | A1 | 1/2002 | Poore, Jr. | |
| 2004/0004155 | A1 | 1/2004 | DeFluemere et al. | |
| 2005/0114023 | A1 | 5/2005 | Williamson et al. | |
| 2005/0128138 | A1 | 6/2005 | McCabe et al. | |
| 2006/0074558 | A1 | 4/2006 | Williamson et al. | |

OTHER PUBLICATIONS

E.L. Crosson et al., "Boost-Phase Acceleration Estimation", Proceedings of the IEEE International Radar Conference of the Year 2000, pp. 210-214.

T. Wigren et al., "Operational Multi-Sensor Tracking for Air Defense"; IEEE Publication 0-7803-3601-1/96/$5.00; copyright in the year 1996.

S.S. Blackman, "Multiple Hypothesis Tracking for Multiple Target Tracking"; IEEE A&E Systems Magazine; vol. 19, No. 1; Jan. 2004; pp. 5-18.

K.C. Chang et al., "Evaluating a Multiple-Hypothesis Multitarget Tracking Algorithm"; IEEE Trans. on Aerospace and Electronic Systems; vol. 30, No. 2; Apr. 1994; pp. 578-590.

Zarchan, Paul, "Tactical and Strategic Missile Guidance," American Institute of Aeronautics and Astronautics; Washington DC, 1990; pp. 308-319.

Papalambros, Panos and Wilde, Douglas, "Principles of Optimal Design, Modeling and Computation", Second Edition, Cambridge University Press, Cambridge UK, 2000; pp. 279-295.

Press et al., "Numerical Recipes in C, the Art of Scientific Computing," Second Edition, Cambridge University Press, Cambridge UK, 1993; pp. 397-425.

"Adaptive interacting multiple model tracking of manuevering targets", Layne, J.R.; Piyasena, U.C. Digital Avionics Systems Conference, 1997; 16th DASC., AIAA/IEEE vol. 1, Oct. 26-30, 1997, Ps:5. 3-16-23.

"Fuzzy multiple model tracking algorithm for manoeuvring target", Dongguang Zuo; Chongzhao Han; Zheng Lin; Hongyan Zhu; Han Hong Information Fusion, 2002, Proceedings of the Fifth International Conference on vol. 2; 2002 Ps: 818-823.

"Efficient robust AMF using the FRACTA algorithm", Blunt, S.D.; Gerlach K. Aerospace and Electronic Systems; IEEE Transactions on vol. 41, Issue 2, Apr. 2005 pp. 537-548.

Kreyszig, E., "Advanced Engineering Mathematics," Eight Edition, John Wiley & Sons, Inc. 1999, pp. 942-952.

"Boost-Phase Intercept", no author listed, no date listed, posted on the internet as fas.org/spp/starwars/program/bpi.htm.

R.L. Garwin, "Boost-Phase Intercept—Not If, But When", Jul. 12, 2000; "Inside Missile Defense", posted on the internet as fas.org/rig/rig0710NMD_TEXT.htm.

D.E. Mosher, "The Grand Plans"; IEEE Spectrum, Sep. 1997, pp. 28-39.

U.S. Appl. No. 12/612,056, filed Nov. 4, 2009, entitled "Maneuvering Missile Engagement" in the name of Friedman, Daniel L.

U.S. Appl. No. 12/473,032, filed May 27, 2009, entitled "Method for Targeting a Preferred Object Within a Group of Decoys", in the name of Boardman et al.

U.S. Appl. No. 12/395,830, filed Mar. 2, 2009, entitled "Generalized Midcourse Missile Guidance", in the name of Diaz, Frederick U.

U.S. Appl. No. 11/868,554, filed Oct. 8, 2007, entitled "Template Updated Boost Algorithm", in the name of Thu-Van Luu.

Office Action dated Aug. 26, 2010, issued in co-pending U.S. Appl. No. 11/868,554, filed Oct. 8, 2007, in the name of Thu-Van Luu.

Notice of Allowance dated Jan. 26, 2010, issued in co-pending U.S. Appl. No. 11/868,554, filed Oct. 8, 2007, in the name of Thu-Van Luu.

* cited by examiner

| NOMINAL TARGET TEMPLATE | | | | |
|---|---|---|---|---|
| TAL | BOOST ACCELERATION | SPEED | ALTITUDE | ANGLE OF ATTACK |
| $T_1$ | $AB_1$ | $V_1$ | $Alt_1$ | $AOA_1$ |
| $T_2$ | $AB_2$ | $V_2$ | $Alt_2$ | $AOA_2$ |
| $T_3$ | $AB_3$ | $V_3$ | $Alt_3$ | $AOA_3$ |
| $T_4$ | $AB_4$ | $V_4$ | $Alt_4$ | $AOA_4$ |
| $T_5$ | $AB_5$ | $V_5$ | $Alt_5$ | $AOA_5$ |
| $T_6$ | $AB_6$ | $V_6$ | $Alt_6$ | $AOA_6$ |
| $T_7$ | $AB_7$ | $V_7$ | $Alt_7$ | $AOA_7$ |
| $T_8$ | $AB_8$ | $V_8$ | $Alt_8$ | $AOA_8$ |
| $T_9$ | $AB_9$ | $V_9$ | $Alt_9$ | $AOA_9$ |
| $T_{10}$ | $AB_{10}$ | $V_{10}$ | $Alt_{10}$ | $AOA_{10}$ |
| $T_{11}$ | $AB_{11}$ | $V_{11}$ | $Alt_{11}$ | $AOA_{11}$ |

BURNOUT TIME ESTIMATION AND EARLY THRUST TERMINATION DETERMINATION FOR A BOOSTING TARGET

FIELD OF THE INVENTION

This invention relates to the sensing of information relating to a boosting missile target, estimation of the future time at which a boosting missile staging event, such as burnout, is expected to occur, and use of such information to improve the guidance of antimissile defenses.

BACKGROUND OF THE INVENTION

Ballistic missile defense has become a significant priority as national intelligence indicates a growing missile threat from rogue nations that might obtain weapons of mass destruction and use ballistic missiles to fire them at U.S. forces abroad, U.S. allies or the continental United States. A desirable engagement strategy against ballistic missiles is to intercept the target as early as possible during the boost phase or early ascent phase when the target is a large object and has not dispersed counter measures or multiple warheads. Such a strategy minimizes the requirements for warhead and decoy discrimination, and allows for multi-layered defense opportunities. A missile defense system supporting this strategy must include an accurate boost phase target state estimator. Without accurate target state estimates, a fire control system cannot obtain valid intercept solutions for launching the interceptor during boost, and intercepting during the early ascent phase. The problem of identifying, determining or estimating the state, and providing guidance of a kill vehicle toward a hostile missile is described generally in U.S. patent application Ser. Nos. 11/356,675 filed Feb. 16, 2006, now U.S. Pat. No. 7,552,669, 11/430,535 filed May 9, 2006, now U.S. Pat. No. 7,511,252, 11/430,644 filed May 9, 2006, now abandoned, and 11/430,647 filed May 9, 2006, now U.S. Pat. No. 7,473,876.

Figure 1:
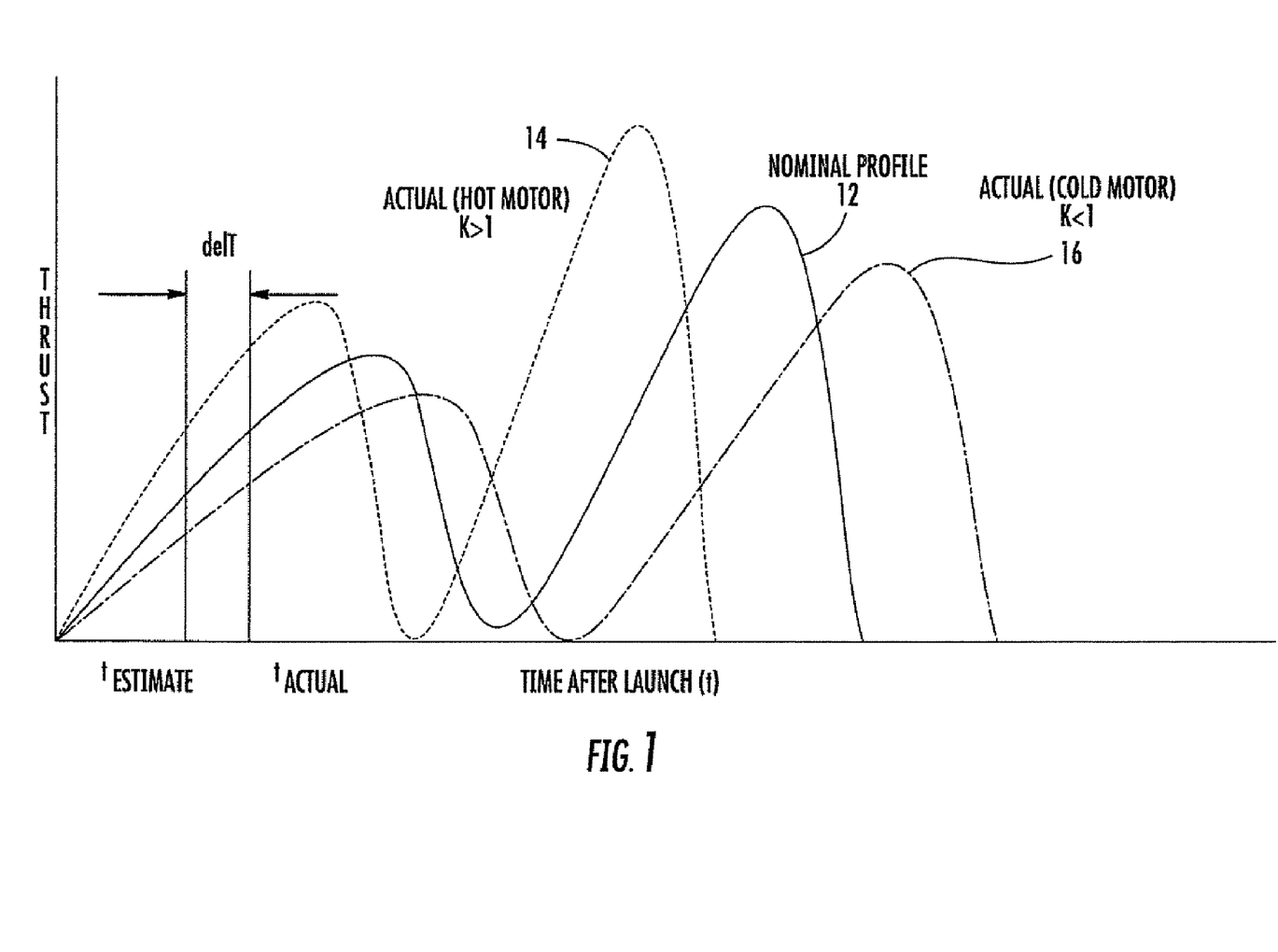
FIG. 1 illustrates variations in target thrust acceleration profiles due to motor variations.

Challenges in developing a boost phase tracking algorithm include unpredictable target accelerations while the target is in powered flight, and uncertainty of its burn time. Targets powered by solid rocket motors present the additional challenge of irregular thrust acceleration profiles. Due to the significant changes in acceleration during the target's boost phase, filters that assume constant acceleration cannot meet the stringent accuracies required of most fire control systems. Current state-of-the-art template-based filters use position and velocity templates assuming constant accelerations or rocket equation acceleration modeling. Such templates are subject to error attributable to motor burn variations, energy management (lofted/depressed trajectories), ISP variations, and early thrust terminations. FIG. 1 is a plot of target thrust versus time for "hot," nominal and "cold" rocket motors or engines. The nominal thrust profile as a function of time after launch (TAL) is shown by plot 12. The actual thrust profile of the motor may be a variation about this nominal profile. For a hot motor, the motor gain (the motor scale factor) is greater than 1, K>1, with the thrust profile shown by plot 14. For a cold motor, the motor gain (the motor scale factor) is less than 1, K<1, with the thrust profile shown by plot 16. It will be clear that the accelerations represented by the thrust profiles of FIG. 1 are significantly different.

In addition, uncertain knowledge of the time of launch of the target results in error in estimating the time after launch. The uncertainty in knowledge of the time after launch leads to error in time indexing into a thrust template, which in turn tends to introduce more error in the acceleration estimate. For example, if the estimate of time after launch in FIG. 1 is indicated by $t_{estimate}$ and the actual time is indicated by $t_{actual}$, there will be a substantial error in estimating the acceleration even if the proper plot were known. The time index error and acceleration variations from the nominal template all contribute to erroneous acceleration estimates and ultimately poor estimates of the target velocity and position. The time index error, referred to herein as delT, is the uncertainty in the target's time after launch (TAL), i.e., the time difference between the initial index into the nominal thrust acceleration template (i.e., estimated TAL) and the target's true TAL. All of these errors, when used for guidance of antimissile assets, can contribute to missing of the target by the antimissile asset. This, in turn, reduces the time that is available to a second antimissile asset to intercept the target, and is costly in that a second antimissile asset must be used.

Improved or alternative estimation of the future time of staging events such as burnout, and early identification after-the-fact of early thrust termination is also desired.

SUMMARY OF THE INVENTION

In the present description, a ^ notation is used to denote filter estimates of the respective variables, and a superscript represents a time update of the respective variables. A method according to an aspect of the invention is for estimating staging of a boosting target, as for example of a missile. The method comprises the steps of sensing position of the boosting target, as for example from moment to moment, to thereby generate target position information, and generating current stage state estimates including position, velocity, time index error into a thrust acceleration template, and motor scale factor $\hat{k}$. The method further comprises the step of determining estimated burnout time $t_{BOEst}$ of the current stage by use of the equation $$t_{BOEst} = \frac{(stageTimeCurrent - stageTimePast)}{\hat{K}} + stageTimePastEst - offsetError + \frac{de\hat{I}T}{\hat{K}}$$

where
stageTime$\hat{C}$urr$\hat{e}$nt=nominal current stage burnout time;
stageTimePast=nominal past stage burnout time;
stageTimePastEst=estimated value of the previous stage burnout time;
$\hat{K}$ and del$\hat{I}$T=state estimates from the filter;
offsetError=initial difference between template_index and measured Time.
The estimated burnout time is used to aid in predicting the future location of the target.

According to another aspect of the invention, a method for determining early thrust termination of a boosting target comprises the step of sensing position of the boosting target, as for example from moment to moment, to thereby generate target position information. Current stage state estimates including position, velocity, time index error into the thrust acceleration template, and motor scale factor $\hat{K}$ are generated. The motor scale factor is used to indicate if the target has early thrust terminated.

Figure 2:
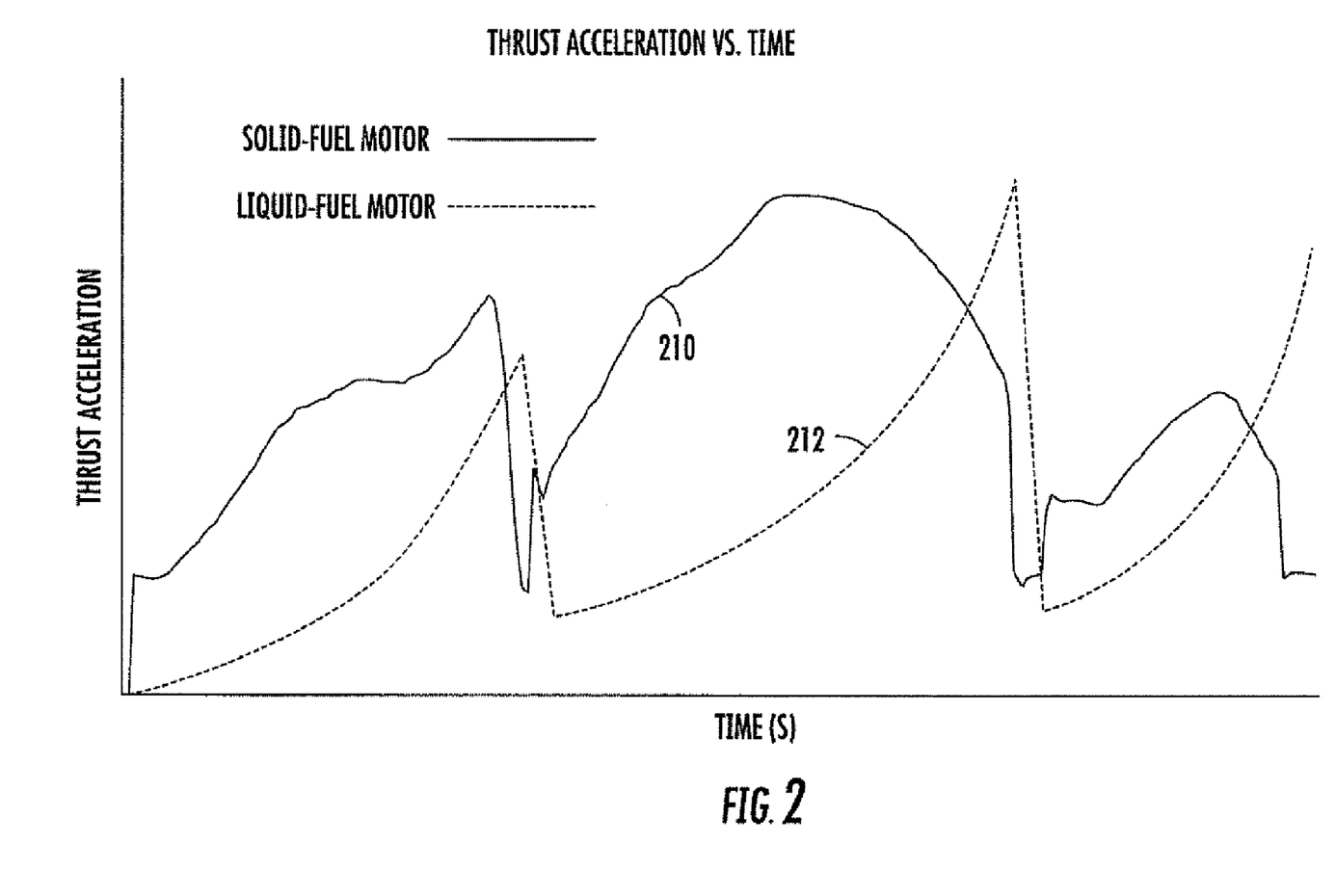
FIG. 2 illustrates typical thrust acceleration template profiles for solid- and liquid-fuel motors.

The Template Updated Boost Algorithm (TUBA) is a boost phase filter or processing that estimates variations with respect to nominal templates representing the target's kinematic motion. FIG. 2 is an example of a typical nominal template profiles of thrust acceleration versus time in seconds (s). In FIG. 2, the thrust acceleration template profile of a solid-fuel motor is illustrated by a solid line designated 210, and the thrust acceleration template profile for a liquid-fuel motor is illustrated by a dash line designated 212. TUBA is capable of estimating rocket motor burn variations, time index error (the time difference between the actual and the estimated Time After Launch), and target's angle of attack. Using nominal thrust acceleration templates corrected by these unique filter states, TUBA predicts future thrust acceleration, position, and velocity vectors with improved reliability. This can be crucial for fire control systems, where knowing the target's future position and velocity is needed to accurately predict an intercept point.

Another boost phase filter is described in U.S. patent application Ser. No. 10/972,943 filed on Oct. 25, 2004, now U.S. Pat. No. 7,181,323, in the name of Boka et al. and entitled Computerized Method for Generating Low-Bias Estimates of Position of a Vehicle From Sensor Data. This boost filter is the Unified Unbiased Rocket Equation Extended Kalman Algorithm (UUREEKA). It differs from TUBA in that UUREEKA models target dynamics using the fundamental rocket equation and is ideal for tracking liquid-fueled targets whose thrust acceleration profiles can be modeled using the rocket equation. UUREEKA is less advantageous for solid fuel rocket motors that exhibit irregular thrust acceleration profiles. TUBA is well adapted for tracking solid-fuel targets that have irregular thrust acceleration profiles, which cannot be modeled by the rocket equation. As mentioned, FIG. 2 shows a representative thrust acceleration template profile 210 for a solid rocket motor, and a representative thrust acceleration template profile 212 for a liquid rocket motor. Since TUBA is template based, it can also be used to track liquid-fuel targets governed by the rocket equation. TUBA complements UUREEKA by providing capability against solid rocket fuel based target threats. Thus, the combination of UUREEKA and TUBA filtering may provide more complete capability against all ballistic missile threats.

Figure 3:
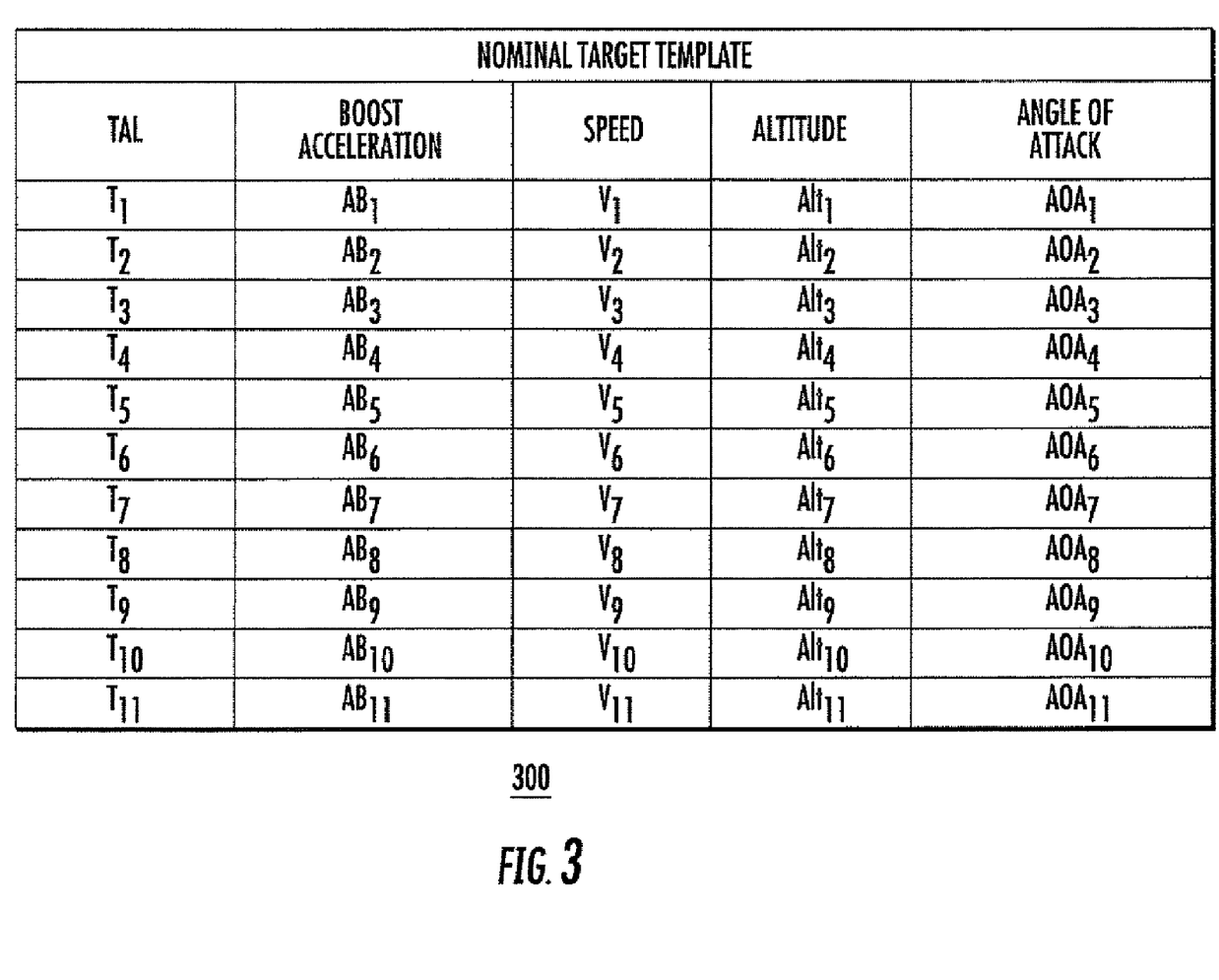
FIG. 3 is a tabular representation of nominal target templates listing nominal values of boost acceleration, speed, altitude, and angle of attack as a function of time after launch, for a particular known type of target.

TUBA uses a template filter which utilizes a table of nominal target data which relates target time after launch (TAL) to boost acceleration, speed, altitude, and angle of attack. An example of a nominal target template data table 300 appears as FIG. 3. In FIG. 3, various Time After Launch (TAL) values designated $T_1$, $T_2$, $T_3$, $T_4$, $T_5$, $T_6$, $T_7$, $T_8$, $T_9$, $T_{10}$, and $T_{11}$ correlate to Boost Acceleration values $AB_1$, $AB_2$, $AB_3$, $AB_4$, $AB_5$, $AB_6$, $AB_7$, $AB_8$, $AB_9$, $AB_{10}$, and $AB_{11}$, respectively, to Speed values $V_1$, $V_2$, $V_3$, $V_4$, $V_5$, $V_6$, $V_7$, $V_8$, $V_9$, $V_{10}$, and $V_{11}$, respectively, to Altitude values $Alt_1$, $Alt_2$, $Alt_3$, $Alt_4$, $Alt_5$, $Alt_6$, $Alt_7$, $Alt_8$, $Alt_9$, $Alt_{10}$, and $Alt_{11}$, respectively, and to Angle of Attack values $AOA_1$, $AOA_2$, $AOA_3$, $AOA_4$, $AOA_5$, $AOA_6$, $AOA_7$, $AOA_8$, $AOA_9$, $AOA_{10}$, and $AOA_{11}$, respectively. Of course, a template may include many more values than the illustrated 11 values, or possibly fewer.

Figure 4:
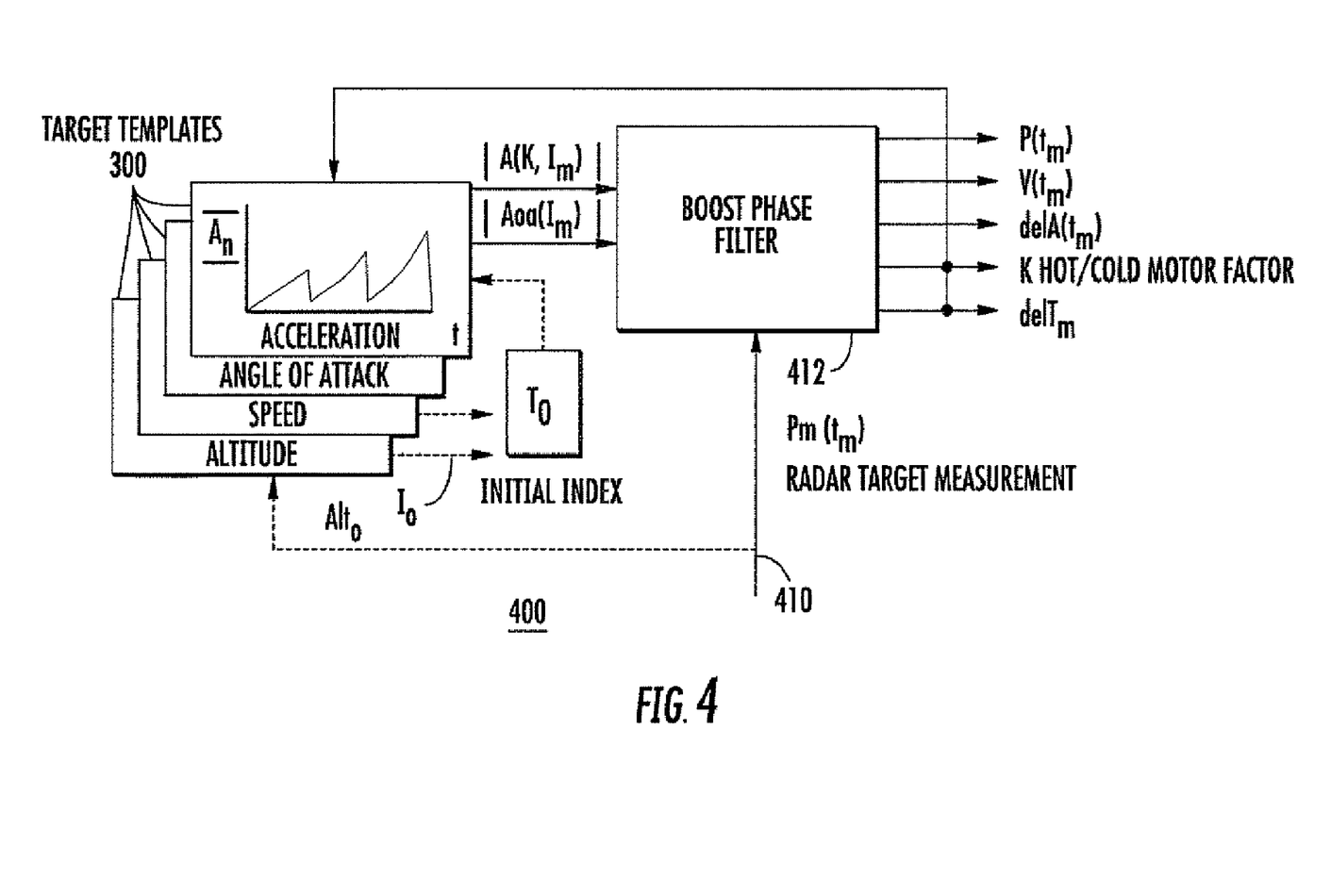
FIG. 4 is a simplified functional block diagram of a template updated boost state estimating arrangement.

FIG. 4 shows how the nominal target template is used in the TUBA process. In FIG. 4, the current radar target measurement is applied by way of a path 410. Ordinarily, the template initialization is performed using the altitude template. Systems such as Spaced Based Infrared Sensor (SBIRS) also provide velocity information which could be used for template initialization using the speed template.

The entry point into the target template 300 of FIG. 4 is found using the current measurement altitude, $Alt_o$, calculated from current target measurement data derived from a sensor such as a radar system. A lookup algorithm is used to select the time index, $I_o$, in the table corresponding to $Alt_o$. $I_o$ refers to the template time index $T_I$ indicated by a subscript in the TAL column of FIG. 3. Thus, if the calculated (or otherwise determined) altitude is, say, one thousand feet, the corresponding altitude in the table might be $T_4$, and the corresponding index is $I_4$. $I_o$ is then used as the initial time entry into the acceleration and angle of attack templates to obtain the target's nominal boost acceleration, and angle of attack. In the example, the index $I_4$ would point to acceleration $AB_4$ and angle of attack $AOA_4$. TUBA processing as represented by block 412 in FIG. 4 uses the Boost acceleration $AB(K,I_m)$ and Angle of Attack $AOA(I_m)$ from the template 300 to produce accurate estimates of the target's position $P(t_m)$ and velocity states $V(t_m)$. In addition, block 412 estimates the error $delA(t_m)$ in angle of attack, error $delT$ in the time index into the thrust acceleration template, and a scalar (hot/cold) motor scale factor, K. In conjunction with the typical position and velocity states, additional states, time index error $delT$ and motor scale factor K, are used to adjust the initial time index $I_o$ to account for initial time index error (possibly attributable to incorrect initial estimate of altitude) and template difference due to motor variations.

Figure 5:
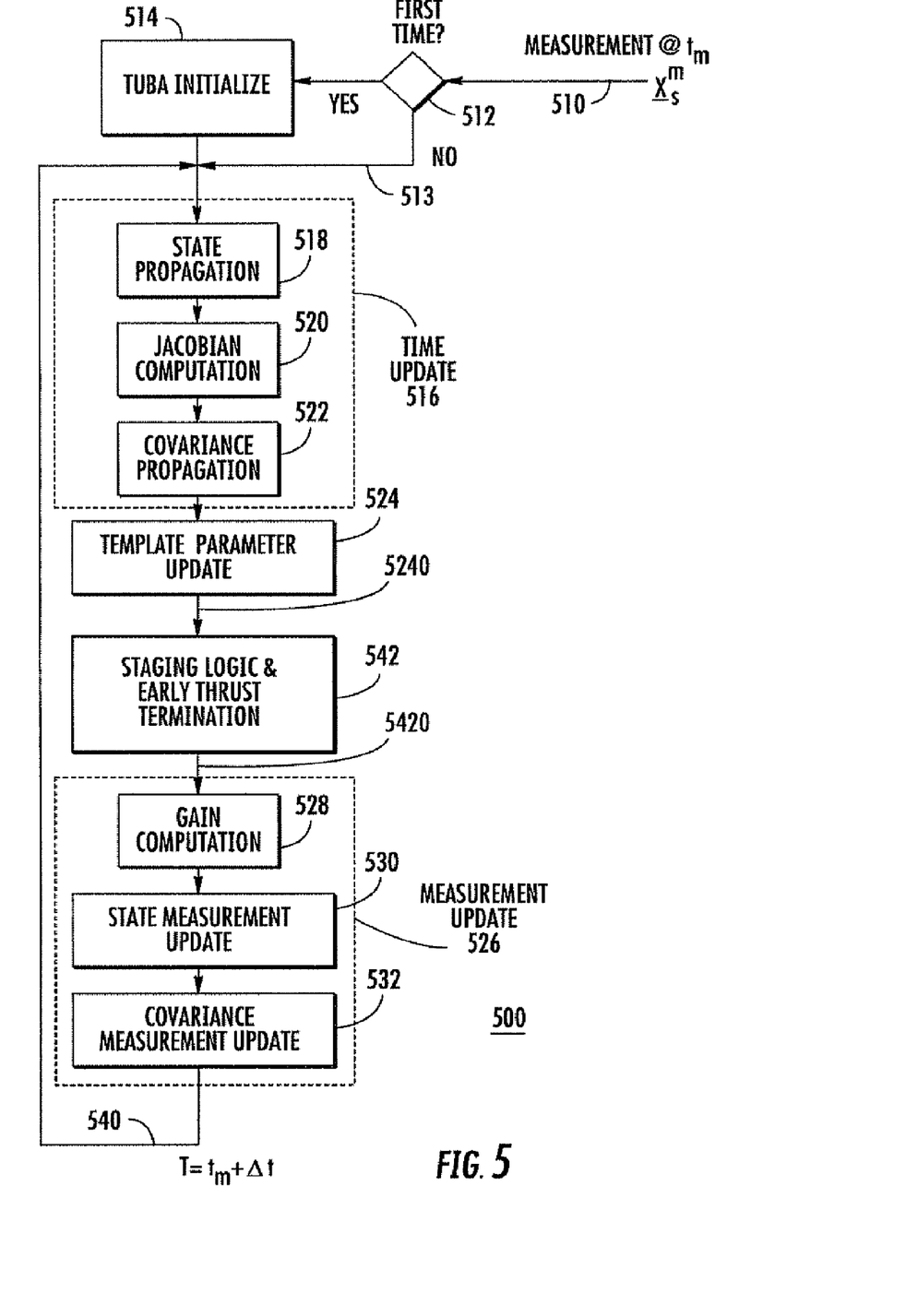
FIG. 5 is a simplified logic flow chart or diagram illustrating computer processing which implements the template updated boost algorithm.

The TUBA algorithm associated with block 412 of FIG. 4 is represented by a logic flow chart or diagram 500 of FIG. 5. In the logic flow of FIG. 5, a measurement is received at time $t_m$ as suggested by logic path 510. The algorithm begins with initialization of filter and timing parameters in blocks 512 and 514. Initial estimates of the filter states and state covariances are then propagated forward in time corresponding to the Kalman "time update" step 516. Staging timing parameters are updated in block 524, after the state propagation, and staging events and early thrust termination are determined in block 542. Finally, the Kalman Gains are computed, and the measurement updated state covariances are updated corresponding to the Kalman filter "measurement update" step 526. The process repeats with the measurement updated state estimates and error covariance feeding back to the time update equations.

Figure 6:
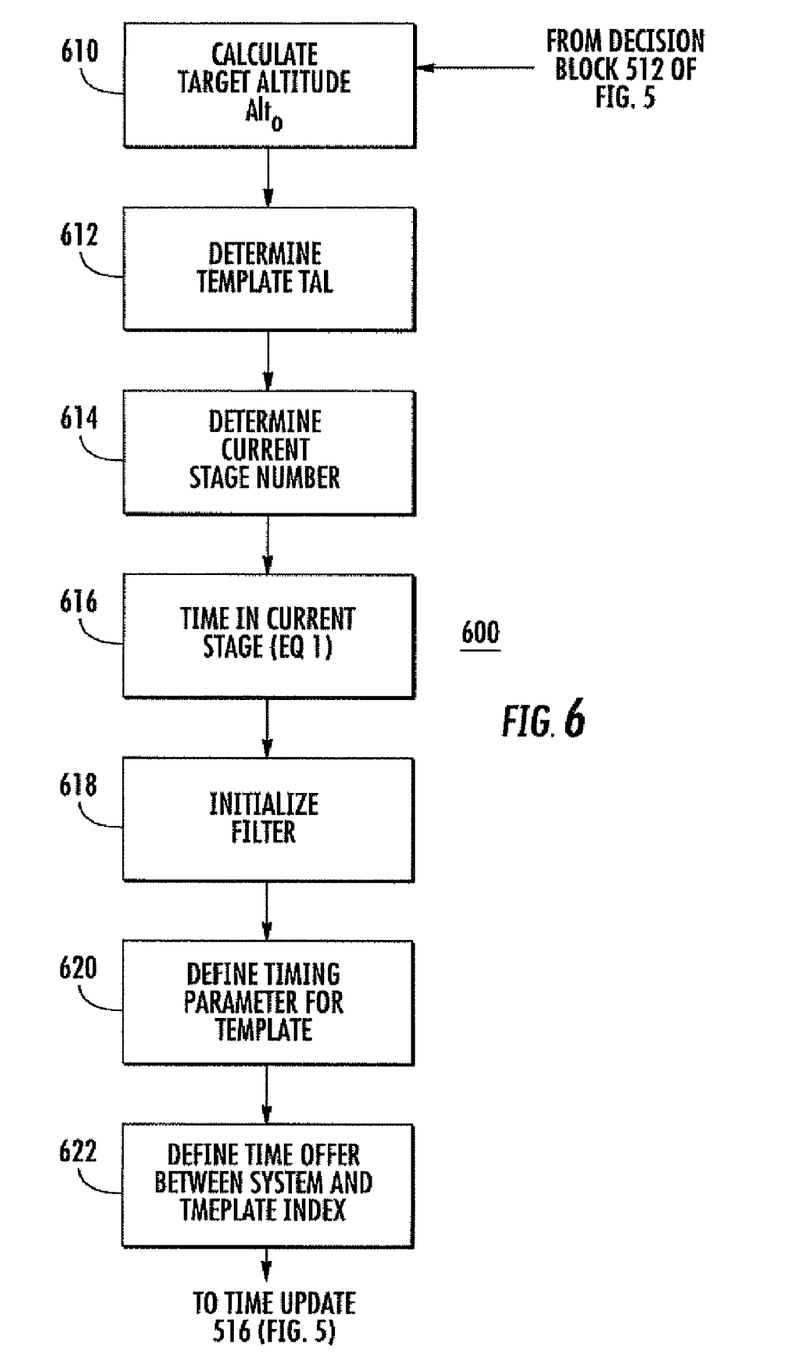
FIG. 6 is a simplified logic flow chart or diagram illustrating an initialization portion of the logic of FIG. 5.
Figure 7:
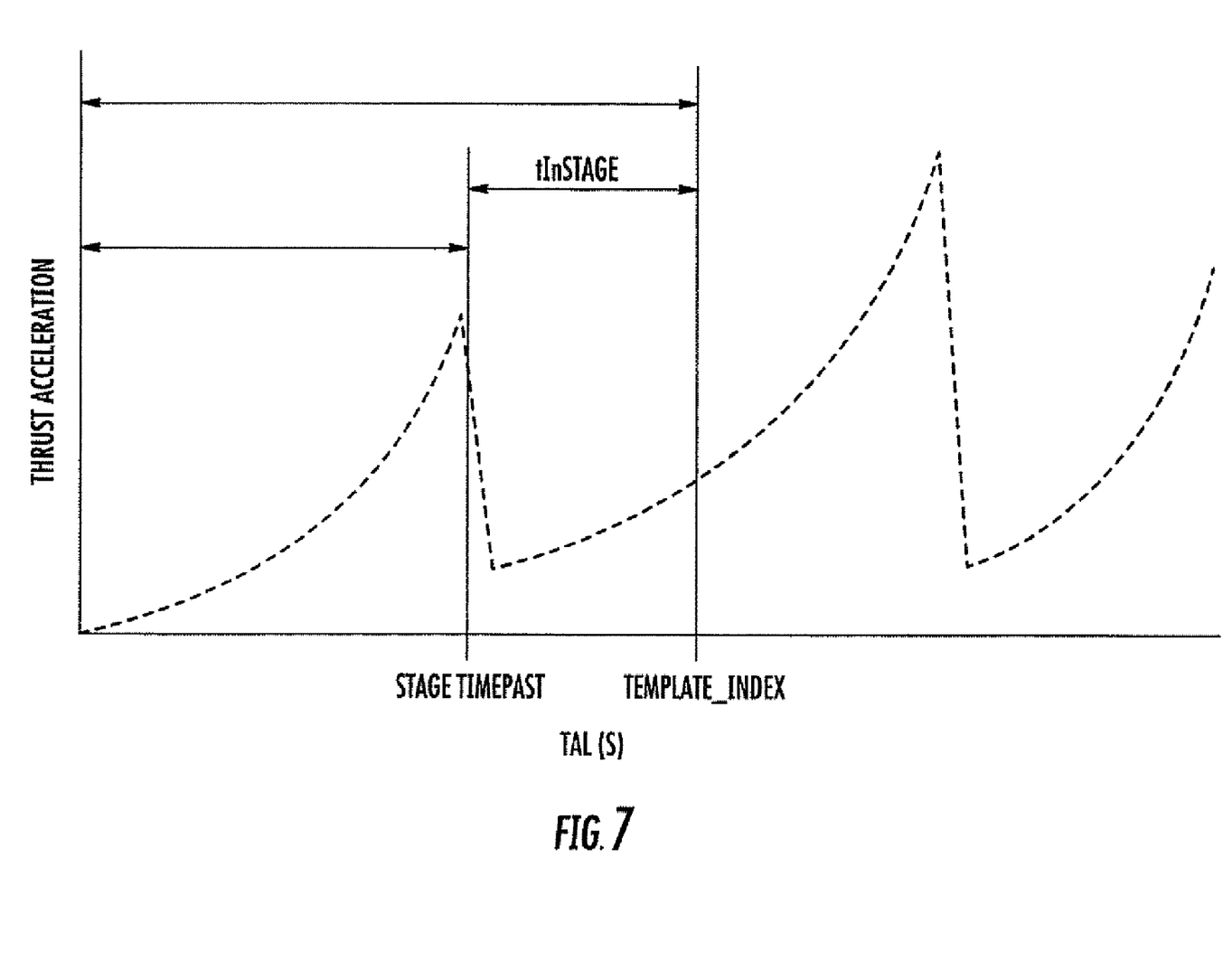
FIG. 7 illustrates a nominal thrust acceleration template versus time after launch, to aid in defining certain parameters.

More specifically, the TUBA process of FIG. 5 begins with arrival over a path 510 of an initial position measurement from a sensor, such as a radar system, tracking a boosting target. Decision block 512 initially routes the measurement to the TUBA Initialization function or block 514. The TUBA Initialization function 514 initializes the filter and template parameters. FIG. 6 represents the logic 600 of the TUBA Initialization step 514 of FIG. 5. In FIG. 6, the first step in initialization of the filter and template parameters is to calculate target altitude $Alt_o$ from the current measured position input, as suggested by block 610 of FIG. 6. From block 610, the logic of the initialization 600 flows to a block 612, which represents use of the table lookup to determine target Time After Launch (TAL) template_index, for the given $Alt_o$. Block 614 represents use of the template_index produced by block 612 together with nominal staging times. Nominal staging times are not derived from part of the templates which are a function of time; rather they are a few data points corresponding to nominal times when the target begins the next stage. For example, if the target has three stages, there will be three corresponding nominal staging times. Nominal staging times are used to determine the target's current stage number thisStage. The amount of elapsed time in the current stage tInstage is determined in a block 616 by $$tInstage = template\_index - stageTimePast \quad (1)$$

where stageTimePast is the nominal stage time of the previous stage, as illustrated in FIG. 7. In FIG. 7, the current time into the template is template_index. Block 618 of FIG. 6 represents the initialization of Kalman filter states and error covariances to produce equations (2), (3), (4), (5), and (6)

$$X = X_M \quad (2)$$

is the initial position vector (set to measured value);

$$\dot{X} = \dot{X}_M \quad (3)$$

is the initial velocity vector (set to an initial estimate);

$$K = 1 \quad (4)$$

is the motor scale factor (set to nominal value);

$$delT = 0 \quad (5)$$

is the initial estimate of error in template_index; and $$delA = 0 \quad (6)$$

is the initial estimate of error in angle of attack.

The TUBA Initialization function 514, represented as 600 of FIG. 6, includes a block 620 which represents the definition of the timing parameter template_index used to look up values from the nominal template $$Template\_index = (tInstage - delT) * K + stageTimePast \quad (7)$$

From block 620, the logic of FIG. 6 flows to a block 622, which represents the definition of the time offset between the system time and template_index $$offsetError = template\_index - tgtMeasTime \quad (8)$$

where variable "tgtMeasTime" is the current system time, variously designated t or tm in FIG. 5.

TUBA uses a nine-state Kalman filter which estimates the position and velocity vectors and three additional states. The three additional states are used to resolve the deficiencies associated with the use of a nominal acceleration profile. The TUBA filter equations are developed under the assumption that the target is either ballistic (falling under the force of gravity) or the specific force (such as thrust acceleration) is exactly known and can therefore be compensated for. It is also assumed that the target is not subject to significant atmospheric drag, which is reasonable in view of the high altitudes at which target tracking occurs. Alternatively, it is assumed that atmospheric drag can be properly compensated for. Equations (9), (10), and (11) model the target kinematics under these assumptions $$\ddot{X} = AccGravity + AccCentripetal + AccThrust + AccCoriolis \quad (9)$$

$$\ddot{X} = \frac{-\mu Z}{|Z|^3} - \omega \times (\omega \times Z) + |Tacc| * \hat{T} - 2\omega \times \dot{X} \quad (10)$$

$$Z = X + Re \quad (11)$$

where:
$\mu$ is the Earth gravitational constant, $3.986005 * 10^{14}$ m³/s²;
w is the magnitude of Earth's angular velocity, $7.29211574 * 10^{-5}$ rad/s;
$|Tacc|$ is the boost acceleration magnitude; and
$\hat{T}$ is the unit thrust vector.

The TUBA state vector is $$s = \begin{Bmatrix} X \\ \dot{X} \\ K \\ delT \\ delA \end{Bmatrix} \quad (12)$$

where:
X and $\dot{X}$ are three-dimensional position and velocity vectors, respectively;
K is a motor scale factor reflecting the target rocket motor, hot (K>1.0), cold (K<1.0), or nominal (K=1.0);
delT is the error in the initial time used to look up target parameters from the nominal templates; and
delA is the error in the estimate of the target's angle of attack.

The TUBA dynamics equations (i.e. the nonlinear TUBA state derivative equations) are $$\dot{s} = \frac{d}{dt} s = \begin{Bmatrix} \dot{X} \\ \frac{-\mu Z}{|Z|^3} - \omega \times (\omega \times Z) + |Tacc| * \hat{T} - 2\omega \times \dot{X} \\ 0 \\ 0 \\ 0 \end{Bmatrix} \quad (13)$$

and are based on the assumed target kinematics set forth above. Additionally, it is assumed that K, delT, and delA are constants.

The thrust acceleration $|Tacc|$, is obtained from the nominal acceleration template using template_index and K estimate as $$|Tacc| = K * BoostAccLookup(template\_index) \quad (14)$$

The unit thrust vector $\hat{T}$ is calculated using the nominal angle of attack lookup, estimated position, velocity, and delA as $$AoaEst = AOALookup(template\_index) + delA \quad (15)$$

$$\underline{yL2} = \hat{\dot{X}} \quad (16)$$

$$\underline{zL2} = (\hat{X} \times \hat{X}) \times \underline{yL2} \quad (17)$$

$$\hat{T} = \underline{yL2} * \cos(AoaEst) - \underline{zL2} * \sin(AoaEst) \quad (18)$$

where the template_index is defined by equation (7).

Referring once more to FIG. 5, the logic flows from initialization block 514 to a state propagation step 518, which is part of time update block 516. In the following description, a ^ notation is used to denote filter estimates of the respective variables, and a superscript represents a time update. Time propagation of the TUBA state vector in block 518 of FIG. 5 is performed by numerically integrating the state derivative vector from the previous time $t_{i-1}$ to the current time $t_i$ where the subscript i refers to the filter cycle iteration $$\hat{s}(t_i)^- = \hat{s}(t_{i-1}) + \int_{t_{i-1}}^{t_{i-1}+\Delta t} \hat{\dot{s}}(\tau) d\tau \quad (19)$$

A $2^{nd}$ order Runge Kutta algorithm might be used for the integration process. The incremental time step, $\Delta t$, refers to either the nominal update cycle time or the incremental time step from the last cycle time to the current measurement time $t_M$ (i.e. $\Delta t = t_m - t_{i-1}$).

From state time propagation block 518, the logic of FIG. 5 flows to a block 520. Block 520 represents calculation of the state transition matrix for the extended TUBA Kalman filter algorithm. The Jacobian matrix corresponding to the state vector and dynamics described in equations (12) and (13) is $$J = \left[\frac{\partial \dot{s}}{\partial s}\right] \quad (20)$$

$$= \begin{bmatrix} \frac{\partial \dot{x}}{\partial s} \\ \frac{\partial \ddot{x}}{\partial s} \\ \frac{\partial \dot{K}}{\partial s} \\ \frac{\partial del\dot{T}}{\partial s} \\ \frac{\partial del\dot{A}}{\partial s} \end{bmatrix}$$

$$= \begin{bmatrix} 0_{3\times 3} & I_{3\times 3} & 0 & 0 & 0 \\ \frac{\partial \ddot{X}}{\partial X} & \frac{\partial \ddot{X}}{\partial \dot{X}} & \frac{\partial \ddot{X}}{\partial K} & \frac{\partial \ddot{X}}{\partial delT} & \frac{\partial \ddot{X}}{\partial delA} \\ & & 0_{1\times 9} & & \\ & & 0_{1\times 9} & & \\ & & 0_{1\times 9} & & \end{bmatrix}$$

where components of the Jacobian corresponding to $$\frac{\partial \dot{x}}{\partial s}$$

are defined below in equations 21 to 26

$$\frac{\partial \ddot{X}}{\partial X} = \frac{-\mu \hat{Z}}{|\hat{Z}|^3} [I_{3\times 3}] - \frac{3}{|\hat{Z}|^2} \hat{Z} \cdot \hat{Z}' - [[\hat{\omega}]] \cdot [[\hat{\omega}]] \quad (21)$$

$$\frac{\partial \ddot{X}}{\partial \dot{X}} = -2 \cdot [[\hat{\omega}]] \quad (22)$$

Note that the [[•]] notation denotes a skew symmetric matrix of the vector argument.

$$\frac{\partial \ddot{X}}{\partial K} \text{ and } \frac{\partial \ddot{X}}{\partial delT}$$

are performed numerically by choosing some small value for $\partial K$ and $\partial delT$. The resulting equations are $$\frac{\partial \ddot{X}}{\partial K} = a1 + \hat{K} * \frac{a2 - a1}{dk} \quad (23)$$

$$\frac{\partial \ddot{X}}{\partial delT} = -\hat{K} * \frac{(a3 - a1)}{dt} \quad (24)$$

where:
dk=0.001
dt=0.01
a1=BoostAccLookup(template_index)
a2=BoostAccLookup(template_index+(tInstage+dt)*dk)
a3=BoostAccLookup(template_index+dt)

The partial derivative of acceleration with respect to the error in angle of attack, $$\frac{\partial \ddot{X}}{\partial delA},$$

is given by $$\frac{\partial \ddot{X}}{\partial delA} = \hat{K} * BoostAccLookup(\text{template\_index}) * \partial \hat{T} \quad (25)$$

where:
$$\partial \hat{T} = \underline{-yL2} * \sin(AoaEst) - \underline{zL2} * \cos(AoaEst) \quad (26)$$

The partial of $\hat{T}$ is taken with respect to angle of attack only, since variations of the thrust vector with respect to position and velocity is minimal. $\hat{T}$, AoaEst, yL2, and zL2 are defined in equations (18), (15), (16), and (17), respectively.

From Jacobian computation block 520 of FIG. 5 the logic flows to a block 522, representing the covariance propagation portion of the time update 516. The state transition matrix used for the time propagation of the TUBA error covariance can be approximated as $$\Phi \approx I + J\Delta t + \frac{J^2 \Delta t^2}{2} \quad (27)$$

The TUBA state covariance is defined as $$P = E\{(s - \bar{s})(s - \bar{s})^T\} \quad (28)$$

Where
s is the TUBA state vector
$\bar{s}$ is the expected value of the TUBA state vector
E is the expected value of $\{*\}$
P is the TUBA state covariance matrix,
with
$P_{11}$=state covariance matrix of X
$P_{22}$=state covariance matrix of $\dot{X}$
$P_{33}$=state covariance element for K $P_{44}$=state covariance element for delT
$P_{55}$=state covariance element for delA
and $$P = \begin{bmatrix} P_{11} & - & - & - & - \\ - & P_{22} & - & - & - \\ - & - & P_{33} & - & - \\ - & - & - & P_{44} & - \\ - & - & - & - & P_{55} \end{bmatrix} \quad (28a)$$

Time propagation of the TUBA error covariance matrix P is performed with the equation $$P(t_i)^- = \Phi P(t_{i-1}) \Phi^T + Q_i \quad (28b)$$

where:
Q is the 9×9 TUBA state noise matrix whose diagonal elements are chosen based on tuning considerations.

From covariance propagation portion or block 522 of time update 516 of FIG. 5, the logic flows to a Template Parameter Update block 524 and then by way of a path 524o to a Staging Logic Early Thrust Termination Block 542, both described in more detail below.

The logic of FIG. 5 arrives by way of a path 542o at a Gain Computation portion 528 of a Measurement Update block 526. The Kalman gain matrix is calculated in block 528 using the measurement matrix and the TUBA error covariance matrix $$K = P(t_i)^- \cdot H^T \cdot (H \cdot P(t_i)^- \cdot H^T + R)^{-1} \quad (29)$$

where:
$H = [I_{3 \times 3} \; 0_{3 \times 3} \; 0_{3 \times 3}]$
H is the measurement matrix, and R is the measurement noise covariance matrix associated with the currently reporting sensor.

The logic flows from block 528 of FIG. 5 to a State Measurement Update block 530. State Measurement Update block 530 computes the measurement residuals and updates the TUBA state vector $$\underline{\hat{s}}_i = \underline{\hat{s}}_i^- + K \cdot (X_m - H \cdot \hat{X}_i^-) \quad (30)$$

Finally, the logic of FIG. 5 reaches the Covariance Measurement Update function 532, which performs the measurement update of the state covariance matrix $$P(t_i) = (I - K \cdot H) \cdot P(t_i)^- \quad (31)$$

and the logic returns to time update block 516, with updated time $T = T_m + \Delta t$ for the next calculation cycle, by way of a path 540.

Template Parameter Update block 524 of FIG. 5 updates the time index, template_index, used in the next filter update pass to look up the thrust acceleration and angle of attack. Template parameters tInstage and template_index are defined in equations (1) and (2), respectively, and are also described in conjunction with block 514 of FIG. 5. At each update after initialization, tInstage and template_index are updated $$tInstage = tInstage + \Delta t \quad (32)$$

where $\Delta t$ is the measurement update interval $$template\_index = (tInstage - del\hat{T}) \ast \hat{K} + stageTimePast \quad (33)$$

where stagetimepast is the nominal past stage.
Note that the initial error in tInstage due to the initial guess at the value of target time after launch is removed in the calculation of template_index via the filter state $del\hat{T}$, and the acceleration profile variation due to motor differences is corrected by the filter state $\hat{K}$.

The TUBA target staging and early thrust termination logic block 542 of FIG. 5 provides timely estimates of the target's burn times and detects when early thrust termination has occurred. Block 542 is not mandatory for estimating the states of a boosting target using nominal template profiles of target (a) thrust acceleration, (b) altitude, (c) speed, and (d) angle-of-attack as a function of time after launch, updated using the states of a filter to correct for template indexing error, template boost acceleration variations, and template angle-of-attack variations. However, the Staging Logic Early Thrust Termination block 542 can improve the accuracy of the target state estimation by providing timely transition to the ballistic phase.

Figure 8:
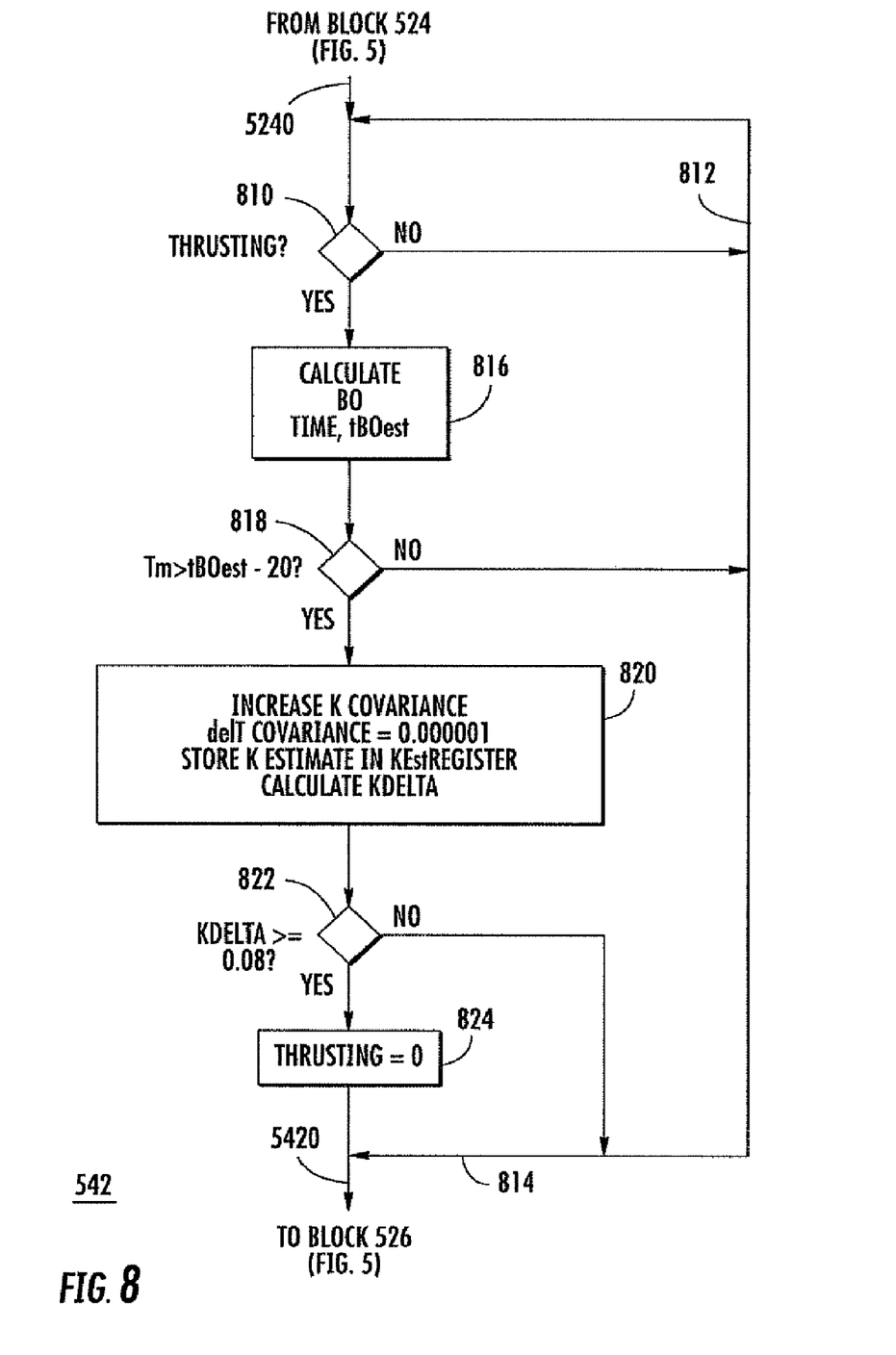
FIG. 8 is a simplified logic flow chart or diagram illustrating details of the logic according to an aspect of the invention.

FIG. 8 is a simplified logic flow diagram or chart illustrating details of block 542 of FIG. 5. In FIG. 8, the logic flow arrives by way of a logic path 524o and reaches a decision block 810, which determines if the target is thrusting or not based on the estimated time of burnout and motor scale factor K. If the target is not thrusting, there is no need to estimate the time of burnout or to determine the existence of an early thrust termination. If the target is not thrusting, the logic leaves decision block 810 by the NO output, and exits the logic of FIG. 8 by way of path 814. The logic also returns by way of a path 812 to decision block 810 to be ready for the possibility of thrusting. If decision block 810 finds that the target is thrusting, the logic leaves decision block 810 by the YES output, and arrives at a burnout (BO) estimating block 816. Burnout (BO) estimating block 816 estimates burn time for the current stage according to equation (34)

$$tBOEst = \frac{(stageTimeCurrent - stageTimePast)}{\hat{K}} + stageTimePastEst - offsetError + \frac{del\hat{T}}{\hat{K}}$$

where:
stageTimeCurrent=nominal current stage burn out time
stageTimePast=nominal past stage burn out time
stageTimePastEst=estimated value of the previous stage burn out time
$\hat{K}$ and $del\hat{T}$=state estimates from the filter
offsetError=initial difference between template_index and measured time.
Staging times for subsequent stages are updated relative to the current stage time estimate.

To account for the uncertainties in the estimated burnout time, a staging window (e.g. 3 to 4 seconds) is set on either side of the estimated current stage burnout time in block 542 of FIG. 5. If the target is within the staging window, the estimated burnout time is used to determine if the target has entered the next stage or has entered the ballistic phase. When a staging event has occurred, filter estimates for motor scale factor $\hat{K}$ and time index error $del\hat{T}$ are reset to their initial values. The target stage number is incremented, and template timing parameters are reinitialized as $K=1$ $delT=0$ thisStage=thisStage+1 offsetError=stageTimeEstPast−tgtMeasTime tInstage=tgtMeasTime−stageTimeEstPast template_time=(tInstage−delT)*$\hat{K}$+stageTimePast  (35)

where:
tgtMeasTime is current system time.

When the target has exited a staging window, the filter error covariance for K and delA are reset to their initial default values by the Staging Logic portion of block 542 of FIG. 5. When the target is ballistic, the error covariance for K, delT, and delA are all reinitialized to some small value, (e.g. 0.00000001).

Liquid-propellant rocket engines control the thrust by varying the amount of propellant that enters the combustion chamber. By stopping the flow of propellants into the combustion chamber, these targets can effectively terminate their thrust prior to the nominal end of boost time. Solid-propellant rockets are not as easy to control as liquid rockets. Once started, the propellants burn until they are gone. However, some solid-fuel engines have hatches on their sides that can be cut loose by remote control to release the chamber pressure and terminate thrust. Early thrust termination poses a particularly difficult problem for tracking since it is an unknown change in acceleration applied at an unknown time. If the filter continues to assume nominal boost acceleration when in actuality the rocket has early thrust terminated, potentially huge errors would result in the estimated states which might well render invalid any fire control solution. The early thrust termination logic portion of block 542 of FIG. 5 attempts to overcome this difficulty by quickly identifying the termination. In general, at 20 seconds (or at some other selected time) prior to the estimated final burnout time, TUBA increases the K covariance values and observes for changes in K estimates. At this point, the K factor has settled to the correct value reflecting the state of the rocket motor. Therefore, a sudden and consistent change in K can only be caused by a substantial change in the target's acceleration. Such a sudden, consistent change in K indicates that the target has early thrust terminated, and gives an indication of the time of thrust termination which can be used in the overall state estimates.

More particularly, from current stage burnout estimation block 816 of FIG. 8, the logic flows to a further decision block 818. Decision block 818, in conjunction with blocks 820, 822, and 824, performs early thrust termination detection. Decision block 818 routes the logic depending on whether the current time is less or later than 20 seconds before the estimated time of burnout $t_{BOEst}$. If the current time is more than 20 seconds before the estimated burnout time, or after the estimated burnout time, the logic leaves decision block 818 by the NO output, and leaves the logic of FIG. 5 by way of path 814. If the current time lies between a time 20 seconds before the estimated burnout time and the estimated burnout time, the logic leaves decision block 818 by the YES output, and arrives at a logic block 820. Block 820 increases or inflates the K covariance according to the initial K covariance value. The current estimate of scalar (hot/cold) motor scale factor K is shifted into a temporary store or Kestimate register with a storage time, in one embodiment, of about four seconds. Block 820 also calculates KDelta by taking the difference between the newest data point in the register and the oldest data point. Decision block 822 compares the value of KDelta with a threshold value. If the change in Kestimate is greater than a particular value, early thrust termination is deemed to have occurred. In one embodiment of the invention, the threshold value of KDelta is 0.08. If KDelta is less than 0.08, continued thrusting is assumed, and the logic leaves decision block 822 by the NO output, and leaves the logic of FIG. 8. If KDelta is greater than 0.08, thrust termination is deemed to have occurred, and the logic leaves decision block 822 by the YES output. From the YES output of decision block 822, the logic of FIG. 8 flows to a block 824, which represents the setting of a "thrusting" flag to zero. From block 824, the logic leaves the flow of FIG. 8 and returns to the flow of FIG. 5.

Thus, a method according to an aspect of the invention is for estimating staging of a boosting target, as for example of a missile. The method comprises the steps of sensing position of the boosting target, as for example from moment to moment. This may be done by means of an infrared sensor or by a radar system, or by another other suitable method. This generates target position information. From the sensed target position information, target current stage state estimates are generated. The target stage state estimates include position, velocity, time index error into the thrust template, and motor scale factor $\hat{K}$. The method further comprises the step of determining estimated burnout time $t_{BOEst}$ of the current stage by use of the equation $$t_{BOEst} = \frac{(stageTimeCurrent - stageTimePast)}{\hat{K}} + stageTimePastEst - offsetError + \frac{de\hat{l}T}{\hat{K}}$$

where
stageTimeCurrent=nominal current stage burnout time;
stageTimePast=nominal past stage burnout time;
stageTimePastEst =estimated value of the previous stage burnout time;
$\hat{K}$ and $de\hat{l}T$=state estimates from the filter;
offsetError=initial difference between templateindex and measured Time.

The estimated burnout time is used to aid in predicting the future location of the target.

According to another aspect of the invention, a method for determining early thrust termination of a boosting target comprises the step of sensing position of the boosting target, as for example from moment to moment, to thereby generate target position information. Current stage state estimates including position, velocity, time index error into the thrust template, and motor scale factor $\hat{K}$ are generated. The motor scale factor is used to indicate if the target has early thrust terminated.

What is claimed is:

1. A method for estimating staging of a boosting target, said method comprising the steps of:
   sensing position of the boosting target from moment to moment to thereby generate target position information;
   generating current stage state estimates including position, velocity, time index error $de\hat{l}T$ into a thrust acceleration template, and motor scale factor $\hat{K}$;
   determining estimated burnout time $t_{BOEst}$ of the current stage by $$t_{BOEst} = \frac{(stageTimeCurrent - stageTimePast)}{\hat{K}} + stageTimePastEst - offsetError + \frac{de\hat{l}T}{\hat{K}}$$

where
stageTimeCurrent=nominal current stage burnout time;
stageTimePast=nominal past stage burnout time;

stageTimePastEst=estimated value of the previous stage burnout time;

$\hat{K}$ and deÎT=state estimates from the filter;

offsetError=initial difference between template_index and measured Time;

and using said estimated burnout time to predict a future location of said target.

2. The method of claim 1, further comprising using said prediction of a future location of said target to guide an antimissile asset toward said target.

3. The method of claim 1, wherein the sensing step is performed using a radar system.

4. The method of claim 1, wherein the sensing step is performed using an infrared sensor.

5. A method for determining early thrust termination of a boosting target, said method comprising the steps of:

sensing position of the boosting target to thereby generate target position information;

generating current stage state estimates including position, velocity, time index error into a thrust acceleration template, and motor scale factor $\hat{K}$;

determining if target has early thrust terminated using the motor scale factor.

6. The method of claim 5, wherein said determining step comprises the steps of:

increasing a K covariance value relative to an initial K covariance value and decreasing a time error covariance value relative to an initial time index error covariance value;

shifting a current estimate of $\hat{K}$ into a temporary storage location, finite length K estimate register, with a corresponding storage time tag;

calculating KDelta by taking difference between the newest $\hat{K}$ in the register and an oldest $\hat{K}$ in the register;

comparing the value of KDelta with a threshold value; and if the change in KDelta is greater than the threshold value, indicating that early thrust termination has occurred.

7. The method of claim 6, wherein if the change in KDelta is less than the threshold value, continued thrusting of the boosting target is deemed to have occurred.

8. The method of claim 6, further comprising guiding an antimissile asset toward said target using said early thrust determination.

9. A system for estimating staging of a boosting target, said system comprising:

a processor for executing instructions for:

sensing a position of the boosting target to generate target position information;

generating current stage state estimates for said boosting target including position, velocity, time index error into a thrust acceleration template, and motor scale factor;

using said current, stage state estimates for said boosting target to determine an estimated burnout time of the boosting target; and using said estimated burnout time of the boosting target to predict a future location of said boosting target.

10. The system of claim 9, wherein the step of determining estimated burnout time of the current stage employs the formula:

$$t_{BOEst} = \frac{(stageTimeCurrent - stageTimePast)}{\hat{K}} + stageTimePastEst - offsetError + \frac{de\hat{I}T}{\hat{K}}$$

where:

$t_{BOEst}$=estimated burnout time stageTimeCurrent=nominal current stage burnout time;

stageTimePast=nominal past stage burnout time;

stageTimePastEst=estimated value of the previous stage burnout time;

$\hat{K}$ and deÎT=state estimates from the filter;

offsetError=initial difference between template_index and measured Time.

11. The system of claim 9, wherein the sensing step is performed using a radar system or an infrared sensor.

12. The method of claim 9, further comprising using said prediction of a future location of said target to guide an antimissile asset toward said target.

13. A system for determining early thrust termination of a boosting target, said system comprising:

a processor for executing instructions for:

sensing a position of the boosting target to generate target position information;

generating current stage state estimates for said boosting target including position, velocity, time index error into a thrust acceleration template, and motor scale factor; and determining if the boosting target has an early thrust terminated using the motor scale factor.

14. The system of claim 13, wherein said determining step comprises the steps of:

increasing a covariance value of the motor scale factor relative to an initial covariance value of the motor scale factor and decreasing a time error covariance value relative to an initial time index error covariance value;

shifting a current estimate of the motor scale factor into a temporary storage register, with a corresponding storage time tag;

calculating a difference between a newest motor scale factor in the register and an oldest motor scale factor in the register;

comparing the difference with a threshold value; and using the difference to determine if early thrust termination has occurred for the boosting target.

15. The system of claim 14, wherein if the difference is greater than a threshold value, early thrust termination is deemed to have occurred.

16. The system of claim 14, wherein if the difference is less than a threshold value, continued thrusting of the boosting target is deemed to have occurred.

17. The system of claim 13, wherein the sensing step is performed using a radar system or an infrared sensor.

18. The method of claim 13, further comprising guiding an antimissile asset toward said target using said early thrust determination.

* * * * *